United States Patent [19]

Bonnes et al.

[11] 3,818,946

[45] June 25, 1974

[54] MEANS FOR PROTECTING AN END OF A TUBULAR MEMBER

[76] Inventors: Hedley Allan Bonnes, The Forge, Bredons Norton, near Tewkesbury; Edward Ravenscroft, Avoncroft, Dock Ln., Bredon, near Tewkesbury, both of England

[22] Filed: Nov. 8, 1972

[21] Appl. No.: 304,786

[52] U.S. Cl. .................................. 138/96 R, 285/3
[51] Int. Cl. ............................................ B65d 59/00
[58] Field of Search .............. 138/96 R, 96 T; 285/3

[56] References Cited
UNITED STATES PATENTS 1,349,789  8/1920  Schirra .......................... 138/96 T
3,352,574  11/1967  Brian ............................ 138/96 R X Primary Examiner—Jerry W. Myracle
Attorney, Agent, or Firm—Cushman, Darby & Cushman

[57] ABSTRACT

An extruded plastics strip for fitment to the end of a pipe to protect said end against damage during transport is of generally U-shape in cross-section including a base and a pair of arms. The strip is particularly intended for use with pipes which have frusto-conical end faces and a portion of the base adjacent one of the arms is of increased thickness to provide additional protection for the radially innermost edge portion of said end face.

14 Claims, 4 Drawing Figures

PATENTED JUN 25 1974  3,818,946

MEANS FOR PROTECTING AN END OF A TUBULAR MEMBER

BACKGROUND OF THE INVENTION

This invention relates to means for protecting an end of a tubular member.

Metal pipes are commonly produced with end faces of frusto-conical form such that, when a pair of such pipes are to be welded together in end-to-end relation, an outwardly facing circumferential groove of triangular cross-section is provided to receive the weld material. Pipeline valve bodies are also often provided with projecting spigots the end faces of which are of frusto-conical formation to facilitate the welding of pipes thereto.

In order to ensure the obtaining of accurate welded joints, it is necessary that the frusto-conical end faces of such pipes and spigots are accurately machined and are protected from damage during transit from the factory to, for example, an oil pipeline. It is accordingly an object of the invention to provide means for protecting an end of a tubular member, more particularly one having an end face of the frusto-conical form aforesaid.

SUMMARY OF THE INVENTION

In accordance with the invention, such means comprises an extruded strip of resiliently deformable synthetic plastics material which is of generally U-shape in cross-section including a base and a pair of arms, with a portion of the base adjacent one of the arms of greater thickness than a portion thereof adjacent the other arm.

The configuration of the strip is preferably such that, in the relaxed state thereof, the arms converge in the direction away from the base whereby, when the strip is fitted on to the end of a tubular member to protect the end face thereof, the arms are resiliently deformed to extend parallel to one another and are thus held resiliently in engagement with the tubular member.

The primary intended purpose of the extruded plastics strip is for the protection of pipes or spigots having frusto-conical end faces. The configuration of the strip is accordingly preferably such that, when in position protecting the end face of such a pipe or spigot, the base of the U is inclined obliquely to the arms of the U and that portion of the base of the U which is of greater thickness is positioned so as to cover the radially innermost part of the end face, said radially innermost part being the most vulnerable to damage.

DESCRIPTION OF THE PREFERRED EMBODIMENTS

Figure 1:
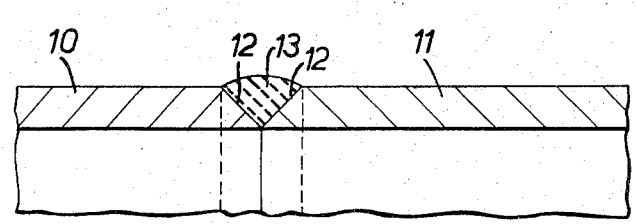
FIG. 1 is a detail sectional view of a welded joint between a pair of lengths of pipe.

FIG. 1 of the drawings illustrates a welded joint between a pair of pipes 10 and 11 each of which has a machined frusto-conical end face 12. In the joint, the radially innermost edges of the end faces 12 are disposed in mutually abutting relationship and said end faces cooperate to define a circumferential rebate of triangular cross-section in which the weld metal 13 is received. It is apparent that the accuracy and effectiveness of the welded joint is dependent on the accuracy of the radially innermost edges of the end faces 12 and that, if said edges are damaged during transit of the pipes, a high scrap rate will be obtained and a substantial proportion of the pipes will be unusable.

Figure 2:
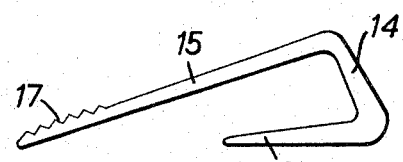
FIG. 2 is a transverse sectional view of a first form of extruded plastics strip.

The extruded strip shown in FIG. 2 of the drawings is of generally U-shape in cross-section, comprising a base 14 and a pair of arms 15 and 16. Arm 15 is longer than arm 16 and the free end portion thereof spaced from the base 14 is externally serrated as indicated at 17. The thickness of the base 14 varies from the end thereof adjacent the arm 15 to the end thereof adjacent the arm 16, being greatest at the junction with the arm 16. The arm 16 is also of varying thickness, its thickness progressively reducing in the direction from the end thereof adjacent the base 14 to the free end thereof. In the relaxed or undeformed state of the strip, the inside surface of the arm 16 is inclined towards the arm 15.

The configuration of the strip is such that, when it is fitted on a pipe 10 or 11, the arms 15 and 16 will extend parallel to each other and the strip will be held resiliently on the end of the pipe as a result of the arms having been resiliently deformed into said parallel relationship. The base 14 of the strip will extend over the end face 12 of the pipe and, as arm 16 fits inside the pipe and arm 15 fits outside the pipe, the greater thickness portion of the base 14 will afford protection for the radially innermost part of the end face of the pipe, which radially innermost part is the most vulnerable to damage during transit.

A continuous length of the extruded strip is supplied to a user who will cut the strip to a length commensurate with the radial dimensions of the pipes. A cut length will then be flexed into a curvate form and the strip fitted on the end of the pipe with the longer arm 15 going outside the pipe. The strip can be fixed to the pipe by banding, the serrations 17 improving the frictional grip obtained between the banding and the strip.

In the particular embodiment shown in FIG. 2 of the drawings, the base 14 of the strip is of progressively decreasing thickness from the end thereof adjacent arm 16 to the end thereof adjacent arm 15. In a modification of said embodiment, the base 14 is of uniform thickness from the end thereof adjacent arm 16 for a distance approximately three fifths of the distance between the arms and then tapers, decreasing in thickness towards the end adjacent arm 15.

Figure 3:
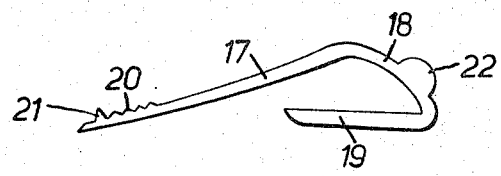
FIG. 3 is a transverse sectional view of a second form of extruded plastics strip.
Figure 4:
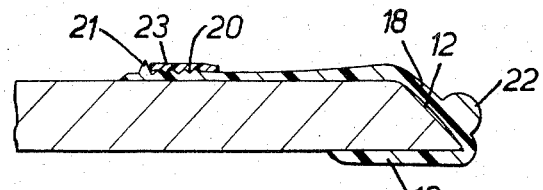
FIG. 4 is a sectional view of the strip of FIG. 3 in use, fitted by banding to the end of a pipe.

The embodiment shown in FIGS. 3 and 4 includes a longer radially outer arm 17, a base 18 and a shorter radially inner arm 19, the inner arm 19 being of greater radial thickness than the outer arm 17 and said outer arm 17 is itself of tapering form, being of greater thickness at the end thereof adjacent the base 18 than it is at the free end thereof. The outer arm 17 is externally serrated at 20 adjacent its free end and said serrations are disposed next to an outwardly projecting rib 21 which is situated between the serrations and said free end, being spaced inwardly of the free end. The distance by which the rib 21 projects from the adjacent surface of the arm 17 is of the same order as but slightly greater than the thickness of the arm 17 in the vicinity of the rib 21.

An arcuate projection 22 is provided on the base 18 of the strip and is spaced from both arms 17 and 19 of the strip. The projection 22 is of such a size and is so positioned that, when the strip is fitted to a pipe as shown in FIG. 4, the projection 22 stands proud, in the direction of the axis of the pipe, of the junction between the base 18 and the inner arm 19. The projection 22, which is positioned closer to the inner arm 19 than it is to the outer arm 17, thus tends to receive any impacts applied to the strip as a result of relative longitudinal movement between the pipe to which the strip is fitted and an obstruction. Such impacts will thus act at a position spaced from the most vulnerable portion of the end face 12 of the pipe.

The banding 23, applied to the strip to fix it to the pipe, is located axially of the pipe by engagement with the upstanding rib 21 the provision of which greatly facilitates the banding operation. The preferred synthetic plastics material from which to form the strip is polyvinylchloride incorporating a plasticiser to ensure that the required flexibility characteristics are obtained.

What is claimed is:

1. Means for protecting an end of a tubular member comprising an extruded strip of a resiliently deformable synthetic plastics material which is of generally U-shape in cross-section including a base and a pair of arms, with a portion of the base extending the length of the strip adjacent one of the arms being of greater thickness than the remainder thereof adjacent the other arm so that the strip may be flexed to curvate form, coaxially slid onto the end to be protected with the U-shape embracing the end.

2. Protecting means according to claim 1, wherein the configuration of the strip is such that, in the relaxed state thereof, the arms converge in the direction away from the base.

3. Protecting means according to claim 1, wherein the configuration of the strip is such that, when the strip is in position fitted to the end of the tubular member, the base of the U is inclined obliquely to the arms of the U.

4. Protecting means according to claim 3, wherein that portion of the base of the U which is of greater thickness is positioned nearer the arm which makes an acute angle juncture with the base thereby being sited to protect the radially innermost part of the end face of the tubular member.

5. Protecting means according to claim 1, wherein that arm of the U which, in use, engages the outer circumferential face of the tubular member on which the strip is fitted is of greater length axially of the tubular member than the other arm of the U.

6. Protecting means according to claim 5, wherein said other arm of the U is of greater thickness than the arm of the U which, in use, engages the outer circumferential face of the tubular member.

7. Protecting means according to claim 1, wherein the outer surface of that arm of the U which, in use, engages the outer circumferential face of the tubular member is provided with a plurality of serrations which extend the length of the strip generally parallel to one another.

8. Protecting means according to claim 7, wherein said arm of the U is formed, adjacent, but spaced inwardly of, its free end, with an outwardly projecting rib which extends the length of the strip generally parallel to the serrations and sited nearer said free end than are said serrations.

9. Protecting means according to claim 8, wherein the degree of projection of the rib is greater than the thickness serrations and of the same arm adjacent the rib.

10. Protecting means according to claim 1, wherein the different thickness portions of the base of the U are afforded by making said base of tapering form progressively reducing in thickness from adjacent one arm to adjacent the other arm.

11. Protecting means according to claim 1, wherein said portion of the base is caused to be thicker by providing the outwardly facing surface of the base of the U with a projection which extends for the length of the strip, is spaced from both arms of the U but is positioned closer to that arm of the U which, in use, is the radially innermost arm.

12. Protecting means according to claim 11, wherein the projection projects from said base a distance such that it stands proud, in use, in the direction of the axis of the tubular member, of the junction between the base and said radially innermost arm.

13. A method of protecting a generally frusto-conical end face of a tubular member during transport and storage thereof, which method comprises taking an extruded synthetic plastics strip of a resiliently deformable synthetic plastics material which is of generally U-shape in cross-section including a base and a pair of arms with a portion of the base adjacent one of the arms of greater thickness than a portion thereof adjacent the other arm, cutting the strip to the required length, flexing the strip into curvate form and fitting it on the end of the tubular member with the greater thickness portion of the base of the U-shaped strip providing protection from the radially innermost part of the end face of the tubular member.

14. A method according to claim 13, which includes fastening the strip to the tubular member by exteriorly, circumferentially banding it.

* * * * *